United States Patent
Suda et al.

(10) Patent No.: US 7,244,368 B2
(45) Date of Patent: Jul. 17, 2007

(54) MANUFACTURING PROCESS OF A MAGNETIC HEAD, MAGNETIC HEAD, PATTERN FORMATION METHOD

(75) Inventors: Shoichi Suda, Kawasaki (JP);
Masayuki Takeda, Kawasaki (JP);
Keiji Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 10/397,832

(22) Filed: Mar. 27, 2003

(65) Prior Publication Data
US 2004/0109263 A1 Jun. 10, 2004

(30) Foreign Application Priority Data
Mar. 29, 2002 (JP) ............................. 2002-094522
Mar. 20, 2003 (JP) ............................. 2003-078720

(51) Int. Cl.
*G11B 5/127* (2006.01)

(52) U.S. Cl. .................. 216/22; 216/40; 216/41; 216/47; 216/49; 216/51; 216/67; 216/72; 216/79

(58) Field of Classification Search ............ 216/22, 216/40, 47, 49, 66, 67, 72; 438/714, 717, 438/725, 734, 739, 951
See application file for complete search history.

(56) References Cited

U.S. PATENT DOCUMENTS

| | | | | |
|---|---|---|---|---|
| 4,272,561 A | * | 6/1981 | Rothman et al. ........... | 438/570 |
| 4,853,080 A | * | 8/1989 | Anthony ..................... | 216/22 |
| 5,407,530 A | | 4/1995 | Watanabe et al. | |
| 5,949,119 A | * | 9/1999 | Vilain ........................ | 257/420 |
| 6,052,261 A | * | 4/2000 | Watanabe et al. ........ | 204/192.1 |
| 6,416,677 B1 | * | 7/2002 | Wei et al. .................. | 216/22 |
| 6,428,714 B1 | * | 8/2002 | Torng et al. ............... | 216/22 |
| 2003/0210458 A1 | * | 11/2003 | Luedecke et al. .......... | 359/350 |

FOREIGN PATENT DOCUMENTS

| | | |
|---|---|---|
| JP | 06-164017 A | 6/1994 |
| JP | 6-215329 A | 8/1994 |
| JP | 09-073610 | 3/1997 |
| JP | 11-175929 | 7/1999 |
| JP | 2001-056910 A | 2/2001 |
| JP | 2002-323775 A | 11/2002 |

OTHER PUBLICATIONS

JPO Office Action dated Sep. 21, 2004.
Japanese Office Action mailed Mar. 27, 2007, Application No. 2003-078720.

* cited by examiner

*Primary Examiner*—Anita Alanko
(74) *Attorney, Agent, or Firm*—Westerman, Hattori, Daniels & Adrian, LLP.

(57) ABSTRACT

A manufacturing method of a magnetic head includes a process for forming a lift-off mask pattern on a magnetoresistance effect element, such that the upper part of the lift-off mask pattern is larger in size than the lower part, a process for forming a couple of electrodes on the magnetoresistance effect element using the lift-off mask pattern as a mask, and a process for removing the lift-off mask pattern. The process for forming the lift-off mask pattern is performed according to a dry etching process.

14 Claims, 12 Drawing Sheets

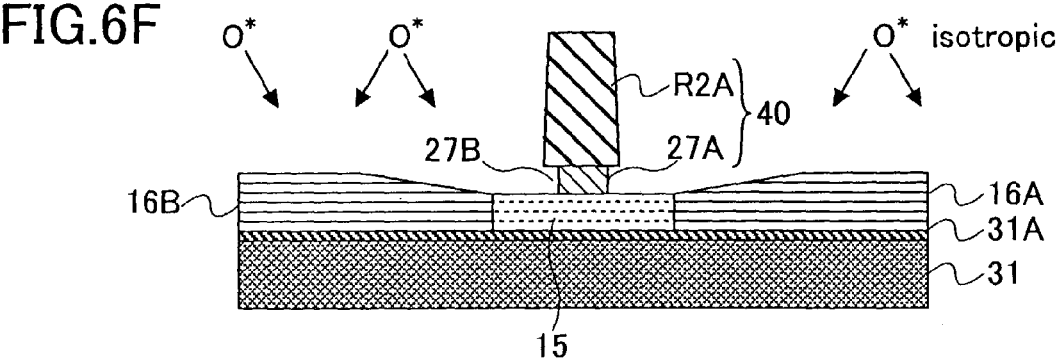
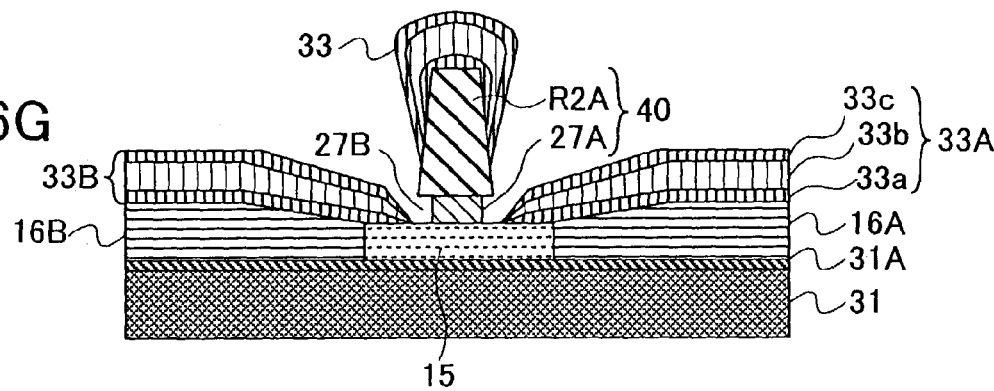
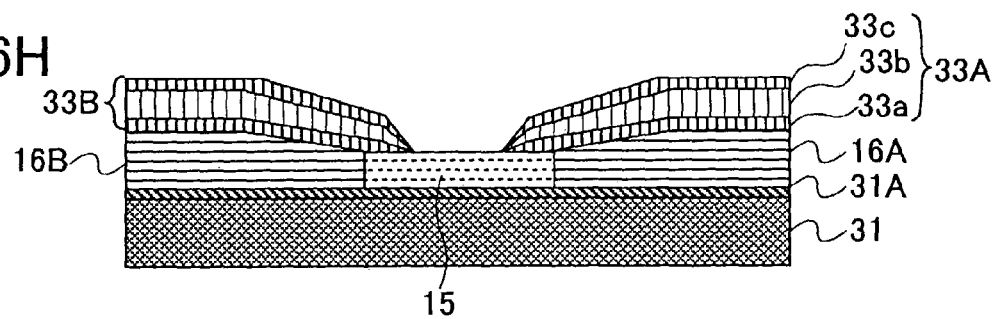

MANUFACTURING PROCESS OF A MAGNETIC HEAD, MAGNETIC HEAD, PATTERN FORMATION METHOD

REFERENCE TO RELATED PATENT APPLICATIONS

The present invention is based on Japanese priority application No. 2002-094522 filed on Mar. 29, 2002 with the Japanese Patent Office, and Japanese priority application No. 2003-78720 filed on Mar. 20, 2003 with the Japanese Patent Office, the entire contents of which are hereby incorporated by reference.

BACKGROUND OF THE INVENTION

The present invention generally relates to a magnetic recording apparatus, and particularly relates to super-fine processing technology that is used for manufacturing a magnetic head, and the like.

At present, hard disk drive units are widely used as mass external storage for a computer, and the like.

Presently, an inductive type thin film magnetic head (inductive head) that senses a magnetic field by induced current generated in a coil is used as the magnetic head of hard disk drive units. As the demand rises for faster operations in connection with increase of recording density, the latest hard disk drive units mainly use a magnetic sensor that employs a magnetoresistance element that directly detects a magnetic field.

Especially in the hard disk drive units of the latest technology, which are capable of high-density recording, a giant magnetoresistance (GMR) effect is adopted for the magnetic sensor. In a typical hard disk drive unit, an element that employs the giant magnetoresistance effect is formed on an $Al_2O_3$—TiC substrate, being compounded into one body with an inductive type writing head, and constituting a magnetic-head slider.

FIG. 1 is a perspective diagram showing a rough composition of the compounded type magnetic head formed by a thin film.

With reference to FIG. 1, a lower magnetic shield layer 31 made of a NiFe alloy etc. is formed by an electrolytic plating method through an $Al_2O_3$ film (not shown) on an $Al_2O_3$—TiC substrate (not shown) that constitutes the magnetic-head slider. On the lower magnetic shield layer 31, a magnetoresistance effect element 32 that has a spin valve structure is formed by a sputtering method through a gap spacer layer 31A (refer to FIG. 2) that is made of, e.g., $Al_2O_3$.

Patterning of the magnetoresistance effect element 32 is carried out into a predetermined form, and reading electrodes 33A and 33B that consist of an electric conductive film typically made of a Ta/Au/Ta laminate are further formed on both ends of the magnetoresistance effect element 32 on the gap spacer layer 31A.

The magnetoresistance effect element 32 is covered by another gap spacer layer (not shown) that is made of, e.g., $Al_2O_3$. Further, an upper magnetic pole layer 34 that is made of, e.g., a NiFe alloy is formed by an electrolytic plating method, and the like, on the gap spacer layer, the upper magnetic pole layer 34 constituting an upper magnetic shield layer. The upper magnetic pole layer 34 and the lower magnetic shield layer 31 may be separately formed.

Further, on the upper magnetic pole layer 34, a writing gap layer (not shown) made of, e.g., $Al_2O_3$ is prepared, and a writing coil 35 made of a Cu layer is formed by an electrolytic plating method through a first layer insulation film (not shown) including a resist, etc. Further, writing electrodes 36A and 36B are formed on both ends of the coil.

The writing coil 35 is covered by another layer insulation film (not shown) that is made of a resist, and the like. An upper magnetic pole layer 37, the tip of which constitutes a writing magnetic pole 38, is formed on the layer insulation film. The upper magnetic pole layer 37 and the writing magnetic pole 38 can be formed by electrolytic plating of the NiFe alloy layer using, for example, a resist mask (not shown).

When forming the upper magnetic pole layer 37 and the writing magnetic pole 38 by electrolytic plating, a resist mask is removed, ion milling using Ar ion is carried out such that the exposed section of the plating base layers is removed, an $Al_2O_3$ film is prepared on the whole surface such that a protective coat (not shown) is formed, and the substrate is diced such that individual chips are obtained. Further, slider processing that includes grinding and polishing processes is performed on each of the chips, and the length, i.e., the gap depth, of the writing magnetic pole 38 is adjusted. In this manner, the magnetic head slider that includes a reading head for reproduction using the magnetoresistance element 32, and a writing head for recording using the inductive type thin film magnetic head is obtained.

It is noted that the magnetoresistance effect element that constitutes the magnetic recording head used by the latest hard disk drive units is required to be further miniaturized corresponding to miniaturization of recording bits, accompanying increase of recording density.

FIG. 2 shows the composition of the magnetic sensor 32 used by the magnetic head of FIG. 1.

With reference to FIG. 2, the magnetic sensor 32 includes a magnetoresistance element 15 that has, e.g., spin valve structure and is formed on the $Al_2O_3$ film 31A that covers the lower magnetic shield layer 31. Further, hard bias patterns 16A and 16B made of a hard magnetic material are formed on both sides of the magnetoresistance element 15 on the $Al_2O_3$ film 31A.

Further, electrode patterns 33A and 33B, each being a laminate of a Ta film 33a, an Au film 33b, and a Ta film 33b, are formed on the hard bias patterns 16A and 16B. The tip section of each of the electrode patterns 33A and 33B extends on the upper surface of the magnetoresistance element 15, with a gap G formed in between. The gap G corresponds to the width of an effective optical core of the magnetic sensor using the magnetoresistance element 15.

FIG. 3 shows the structure of the magnetoresistance element 15 of FIG. 2 in more detail.

With reference to FIG. 3, the magnetoresistance element 15 includes a free layer $15_1$ made of a ferromagnetic material layer, such as FeNi and a Co alloy, with its magnetization direction being changed by an external magnetic field, a non-magnetism electric conduction layer $15_2$ including a Cu layer, etc. prepared on the free layer $15_1$, and a pinned layer $15_3$ having a fixed magnetization direction, and including a ferromagnetic material layer, formed on the non-magnetism electric conduction layer $15_2$. The magnetization direction of the pinned layer $15_3$ is pinned by a pinning layer $15_4$ including a hard magnetic material layer such as CoCrPt, an antiferromagnetism layer, etc. formed on the pinned layer $15_3$.

Further, the laminating structure including the free layer $15_1$, the non-magnetism electric conduction layer $15_2$, the pinned layer $15_3$, and the pinning layer $15_4$ is supported on both sides by the hard bias patterns 16A and 16B that consist of CoCrPt, etc., and the hard bias patterns 16A and 16B determine the magnetization direction of the free layer 151 in the state where there are no external magnetic fields.

Thus, the magnetoresistance element 15 has the so-called spin valve structure, and detects an external magnetic field in the form of magnetic resistance by passing a sense current I between the reading electrodes 33A and 33B. At this instance, by forming the reading electrodes 33A and 33B on the hard bias patterns 16A and 16B, respectively, with the tip sections extending on the surface of the magnetoresistance effect element 15, such that the so-called overlaid structure is formed, the sense current I can be provided, avoiding an insensitive zone formed near the border plane between the magnetoresistance effect element 15 and either of the hard bias patterns 16A and 16B. In this manner, the S/N ratio relative to magnetization signal detection is improved.

It is noted that, in the magnetic overlaid type sensor such as mentioned above, the optical core width part G between the tip section of the reading electrode 33A and the tip section of the reading electrode 33B participates in the performance of the magnetoresistance detection. Specifically, the smaller the optical core width part G is, the higher the spatial resolution of the magnetic detection is. That is, in order to detect magnetized spots that are densely arranged on a disk, it is desirable that the optical core width G be reduced as much as possible in reference to the structure of FIG. 3.

FIGS. 4A through 4H show a manufacturing process of a spin valve sensor that has the conventional overlaid structure.

With reference to FIG. 4A, a spin valve layer 15L is formed on the $Al_2O_3$ film 31A. At FIG. 4B of the process, the spin valve layer 15L is patterned by a resist pattern R1, which results in the spin valve structure 15 being formed.

Further, in FIG. 4B of the process, a CoCrPt film 16 is accumulated, and as a result, the hard bias patterns 16A and 16B are formed on the $Al_2O_3$ film 31A on both sides of the spin valve structure 15. FIG. 4B clearly shows that the CoCrPt film 16 is accumulated on the resist pattern R1.

Next, at FIG. 4C of the process, the CoCrPt film 16 is lifted-off with the resist pattern R1, and an organic polymer film 17 and a resist film R2, such as PMGI (poly dimethyl glutamid), are formed on the spin valve structure 15, so that the hard bias patterns 16A and 16B on both sides may also continuously be covered.

Then, at FIG. 4D of the process, the resist film R2 is exposed and developed, and a resist pattern R2A is formed. At FIG. 4E of the process, wet etching removes the organic polymer film 17 using the resist pattern R2A as a mask. At this time, due to a difference in the etching selectivity between the resist pattern R2A and the organic polymer film 17, the organic polymer film 17 receives lateral etching, and an organic polymer film pattern 17A smaller than an exposure limit is formed at the bottom of the resist pattern R2A as shown in FIG. 4F. Moreover, during the wet etching, the resist pattern R2A also receives lateral etching (slimming), and its size is reduced below the exposure limit. Thus, as a result of the organic polymer film pattern 17A receiving the lateral etching, an undercut 17B is formed directly under the resist pattern R2A on both sides of the organic polymer film pattern 17A.

Further, at FIG. 4G of the process, a Ta film 33a, an Au film 33b, and a Ta film 33c are deposited one by one by sputtering on the structure of FIG. 4F, using a structure 20 including the polymer film organic pattern 17A and the resist pattern R2A as the mask. On the hard bias patterns 16A and 16B, the electrode patterns 33A and 33B, respectively, are formed, extending on the upper surface of the magnetoresistance effect element 15 toward the root of the organic polymer film pattern 17A.

Further, by removing the organic polymer film pattern 17A at FIG. 4H of the process, an electrode layer 33 deposited on the resist pattern R2A is removed.

Conventionally, miniaturization of a magnetoresistance effect element has been achieved by shortening exposure wavelength, using an exposure optical system that has a high aperture rate (NA), and improving resist materials used in resist processes. However, the conventional miniaturization technique is coming to a turning point in view of difficulty of developing a resist material suitable for use with short wavelength, particularly in the case of miniaturization exposure technology after a 0.1 μm generation that uses an ArF excimer laser, etc.

Under the situation such as above, in the conventional manufacturing process described with reference to FIGS. 4A through 4H, the organic polymer film pattern 17A, such as PMGI, is used, and a miniaturization process that exceeds the exposure limit is performed using the etching selectivity between the resist pattern R2A and the organic polymer film pattern 17A at FIGS. 4E and 4F of the process. At FIG. 4E of the process, the conventional manufacturing method uses wet etching, which does not provide sufficient controllability of etching in the lateral etching process of FIG. 4F, which can then cause the mask pattern structure 20 that is to be used as a lift-off mask at FIG. 4G of the process, including the resist pattern R2A and the organic polymer film 17A, to fall after the process of FIG. 4F is finished. The falling of the mask pattern structure 20 greatly degrades the manufacturing yield of the magnetic head. Moreover, even if the structure 20 does not fall, control of the size of the organic polymer film pattern 17A is difficult; consequently, control of the optical core width G (refer to FIG. 3) of the magnetoresistance element 15 becomes difficult.

Although it is desirable to use a dry etching process instead of a wet etching process in order to perform the lateral etching process of FIG. 4F with a high manufacturing yield, it is difficult to obtain sufficient selectivity to dry etching by the combination of the resist film R2 and the organic polymer film 17, which is conventionally used.

Moreover, although it is effective to shorten the exposure wavelength in the exposure process of the resist pattern R2A of FIG. 4D in order to form a miniaturized element, as previously mentioned, conventional organic polymer films, such as PMGI, do not function as antireflection films. For this reason, even if an exposure light source that provides short wavelength is used, it is difficult to expose the resist pattern R2A near the exposure limit. As an antireflection film, a SiN film is conventionally known. However, when the SiN film is used instead of the organic polymer film 17, the lateral etching process like FIG. 4F cannot be performed.

SUMMARY OF THE INVENTION

Accordingly, a general object of the present invention is to provide a new and useful magnetoresistance effect type magnetic head, and a manufacturing method thereof that solve the problems described above.

Specifically, an object of the present invention is to provide a manufacturing method of a magnetoresistance effect type magnetic head, which can manufacture a magnetoresistance effect element at a high manufacturing yield using a miniaturization process, where the exposure limit is exceeded.

Another object of the present invention is to provide a magnetoresistance effect type magnetic head that has a low Barkhausen noise level.

Another object of the present invention is to provide a manufacturing method of a magnetoresistance effect element, including a process for forming a lift-off mask pattern on the magnetoresistance effect element, such that an upper part of the lift-off mask pattern is larger than a lower part of the lift-off mask pattern, a process for forming a pair of electrodes on the magnetoresistance effect element, using the lift-off mask pattern as a mask, and a process for removing the lift-off pattern, wherein the process for forming the lift-off mask pattern is carried out by a dry etching process.

According to the present invention, since a lift-off mask pattern can be formed by dry etching, defects in the lift-off mask pattern decrease in number, and a super-high-resolution magnetic head including the magnetoresistance element that has a core size below the resolution limit can be manufactured efficiently and at a high yield rate.

Another object of the present invention is to provide a magnetic head equipped with an overlaid type magnetic sensor including a magnetoresistance element and first and second electrodes formed on the upper surface of the magnetoresistance element so that tip sections of the electrodes are disposed at an interval of 70 nm or less, and are arranged with a tapering angle of 40 degrees or less.

According to the present invention, the tapering angle of the first and the second electrode tip sections is set at 40 degrees or less, and Barkhausen noise can be suppressed.

Another object the present invention is to provide a magnetic recording apparatus equipped with a magnetic recording medium and a magnetic head that scans the magnetic recording medium, wherein the magnetic head includes an overlaid type magnetic sensor including a magnetoresistance element and first and second electrodes formed on the upper surface of the magnetoresistance element such that tip sections of the first and second electrodes are separated at an interval of 70 nm or less and are arranged with a tapering angle of 40 degrees or less.

According to the present invention, signal reproduction with little Barkhausen noise becomes possible by setting the tapering angle of the first and the second electrode tip sections at 40 degrees or less.

Another object of the present invention is to provide a pattern forming method, which includes a process for forming an organic polymer film on a substrate, a process for forming a resist pattern on the organic polymer film, a process for patterning the organic polymer film by dry etching using the resist pattern as a mask, and a process for forming an organic polymer pattern that is smaller than the resist pattern using the organic polymer film under the resist pattern. Here, the dry etching process is such that isotropic etching is carried out under a condition that the etching speed of the dry etching process of the organic polymer pattern is set higher than the etching speed of the resist pattern.

According to the present invention, an isolated pattern can be formed below the resolution limit, and such that the size of the lower part of the isolated pattern is smaller than the upper part of the isolated pattern.

BRIEF DESCRIPTION OF THE DRAWINGS

FIGS. 6A through 6H show a manufacturing process of a magnetic sensor according to a first embodiment of the present invention;

DESCRIPTION OF THE PREFERRED EMBODIMENTS

[Principle]

Hereafter, the principle of the present invention is described with reference to FIG. 5. As regards items previously described, the same reference numbers are given, and description thereof is omitted.

Figure 5:
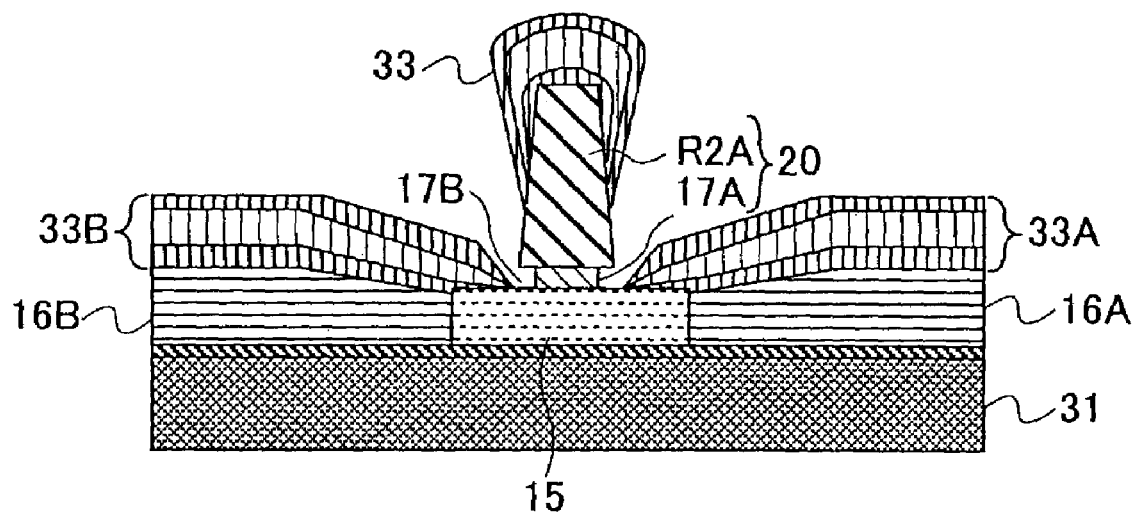
FIG. 5 is for describing a principle of the present invention.

With reference to FIG. 5, the manufacturing process of the magnetic head that has the overlaid structure using the magnetoresistance element according to the present invention is characterized by forming an undercut section 17B by a dry etching method at the portion corresponding to a lower section 17A of the lift-off mask pattern 20 that is used when a lift-off process forms the electrode patterns 33A and 33B that form the overlaid structure.

According to the present invention, when slimming the upper part R2A of the lift-off mask pattern 20 is carried out, the undercut 17B is simultaneously formed corresponding to the lower part 17A of the lift-off mask pattern 20 by carrying out lateral etching of the lower part 17A of the lift-off mask pattern 20. Then, the magnetoresistance effect element 15 that has the core section G, which is miniaturized beyond the usual optical resolution limit, is obtained by forming the electrodes 33A and 33B using the lift-off pattern 20 obtained as described above.

The simultaneous process of slimming the upper part R2A, and forming the undercut 17B by lateral etching of the lower part 17A is made possible by forming the upper part R2A and the lower part 17A of the lift-off mask pattern 20 by different materials, such that the etching speed of the lower 17A becomes higher than the etching speed of the upper part R2A.

Especially, by forming the upper part R2A with a resist material that contains Si and forming the lower part 17A with an organic polymer an etching selection ratio of two (2) or higher can be obtained between the resist pattern that constitutes the upper part R2A and the organic polymer pattern that constitutes the lower part 17A.

When the resist pattern R2A and the organic polymer pattern 17A constitute the lift-off pattern 20, it is desired that the slimming process and the undercut formation process be carried out by plasma processing, wherein oxygen-containing gas is used such that anisotropy etching and isotropic etching are available by setting conditions, such as applied power and gas pressure. As the oxygen containing gas, $O_2$, CO, $CO_2$, NO, and mixtures thereof can be used, for example. Moreover, it is also possible to mix $N_2$ or Ar gas in these gases.

The slimming process and the undercut formation process may also be performed using etching gases containing fluorocarbon and oxygen, wherein processing conditions such as applied voltage and gas pressure are adjustable. In such case, $CF_4$, $CHF_3$, and mixtures thereof can be used as the fluorocarbon, for example; and $O_2$, CO, $CO_2$, NO, and mixtures thereof can be used as the oxygen-containing gas, for example, as previously described. In such case, the selectivity ratio between the resist pattern R2A and the organic polymer pattern 17A can be 10 or higher by using a resist material that contains Si as the upper pattern R2A, and using an organic polymer film as the lower pattern 17A. Moreover, it is also possible to mix $N_2$ or Ar gas in these gases.

Further, the slimming process is not limited to a plasma processing process using oxygen-containing gas. An ozone process can be used, wherein ozone gas is obtained by irradiating 172 nm excimer laser light to an oxygen atmosphere. Alternatively, an immersing process can be used, wherein the object to be processed, which has the lift-off pattern 20, is immersed in ozone water. In this wet processing process, strong isotropic etching is attained.

Further, by using an organic polymer film as an antireflection film as the organic polymer film that constitutes the lower part 17A, deformation of the pattern originated due to unevenness of a surface by the reflected light at the time of exposure of the resist pattern R2A can be suppressed, the surface being, for example, the surface of the hard bias patterns 16A and 16B.

[The First Embodiment]

Hereafter, a manufacturing process of a thin film magnetic head according to a first embodiment of the present invention is described, with reference to FIGS. 6A through 6H. As regards items previously described, the same reference numbers are given, and description thereof is omitted.

Figure 4A:
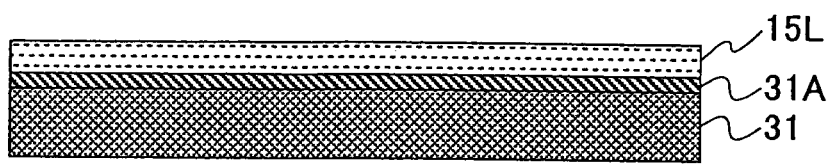
FIGS. 4A through 4H show a manufacturing process of the conventional magnetic sensor.
Figure 6A:
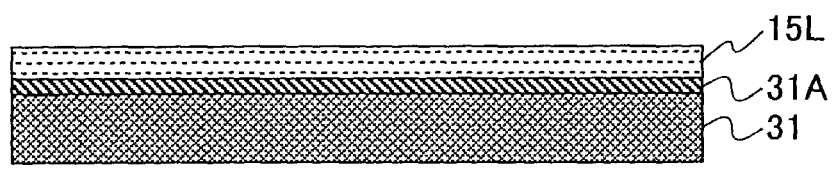

With reference to FIG. 6A, first, the lower magnetic shield layer 31 including a NiFe alloy is formed by the electrolytic plating method on an $Al_2O_3$—TiC substrate (not shown) through an $Al_3O_2$ film (not shown), and a spin valve structure film 15L is formed by the sputtering method through a gap spacer layer 31A of $Al_2O_3$, as previously described with reference to FIG. 4A.

Figure 4B:
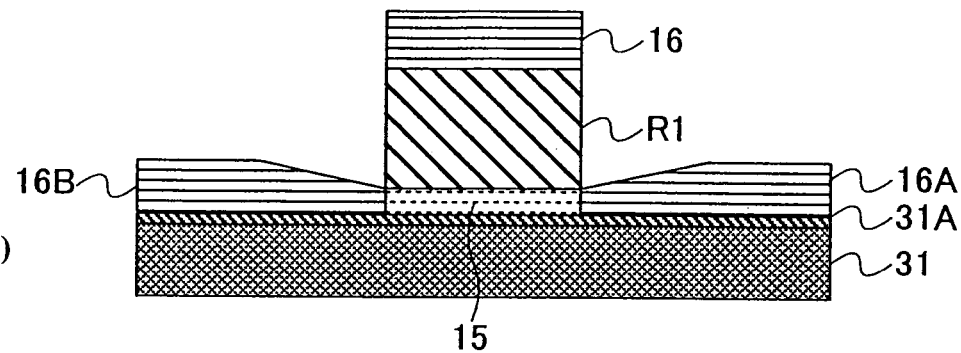
Figure 4C:
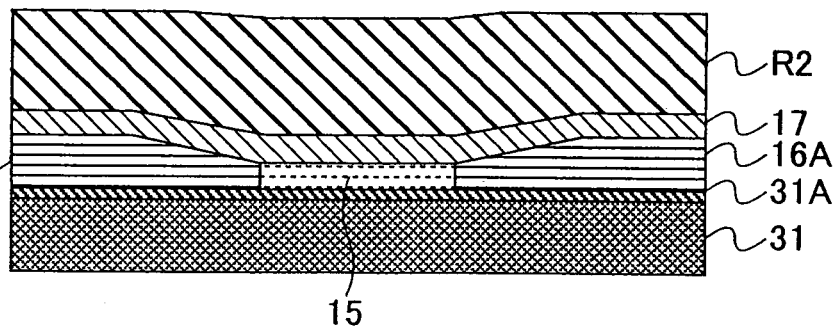
Figure 6B:
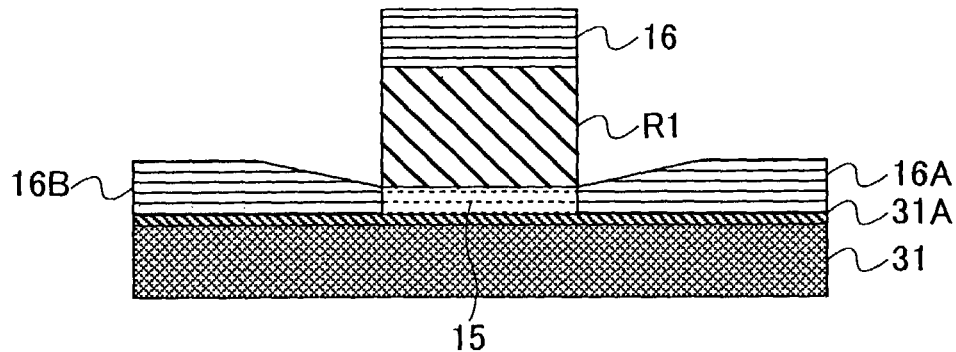

Next, at FIG. 6B of the process, like the process of FIG. 4B, patterning of the spin valve structure film 15L is carried out in a predetermined form with a width of, e.g., 300 nm using the resist pattern R1 as a mask. The magnetoresistance effect element 15 is thereby formed. Further, at FIG. 6B of the process, a hard bias film 16 including CoCrPt is formed by a sputtering method using the resist pattern R1 as a mask. Then, the hard bias patterns 16A and 16B are formed on both sides of the magnetoresistance effect element 15.

Figure 6C:
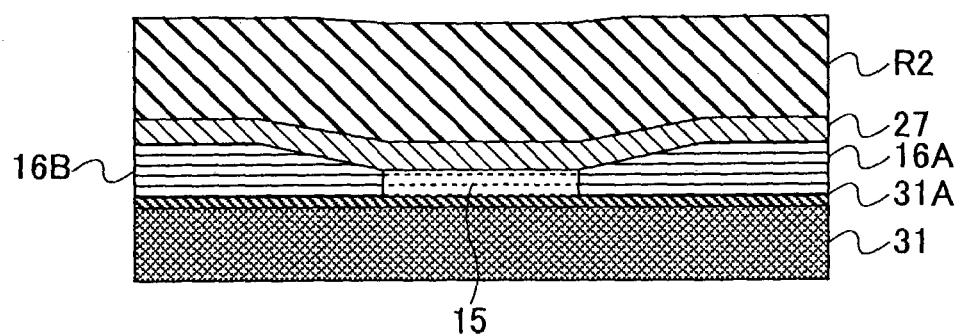

Next, in FIG. 6C of the process, the resist pattern R1 and the CoCrPt film 16 deposited on the top of the resist pattern R1 are removed, and further, an antireflection film 27 including an organic polymer film, thickness of which is, e.g., 80 nm, is formed to cover the magnetoresistance effect element 15 and the hard bias patterns 16A and 16B on both sides. ARC-XLX (a brand name of Brewer Science, Inc.) may be used, for example, as the antireflection film 27.

At FIG. 6C of the process, a positive type resist film R2 for KrF excimer laser is further applied to a thickness of, e.g., 500 nm on the antireflection film 27. Here, the ARC-XLX film is a film of a polyimide system, and is insoluble in resist developers, such as TMAH (Tetra Methyl Ammonium Hydroxide) solution after a baking process.

Figure 4D:
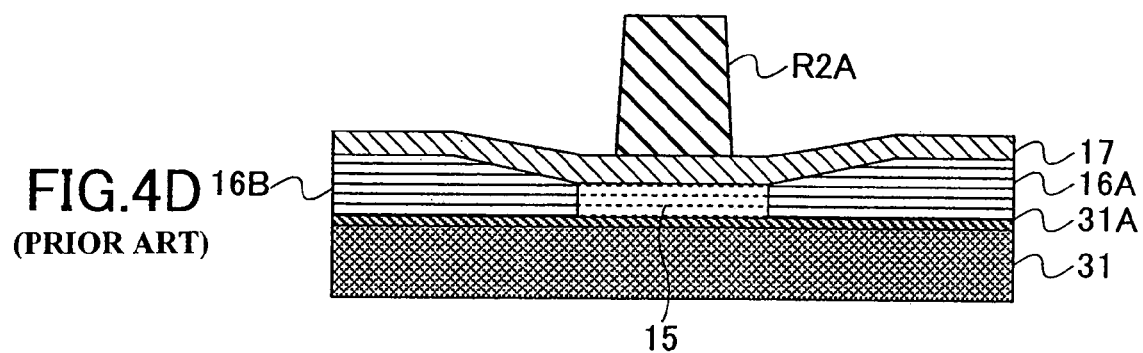
Figure 4E:
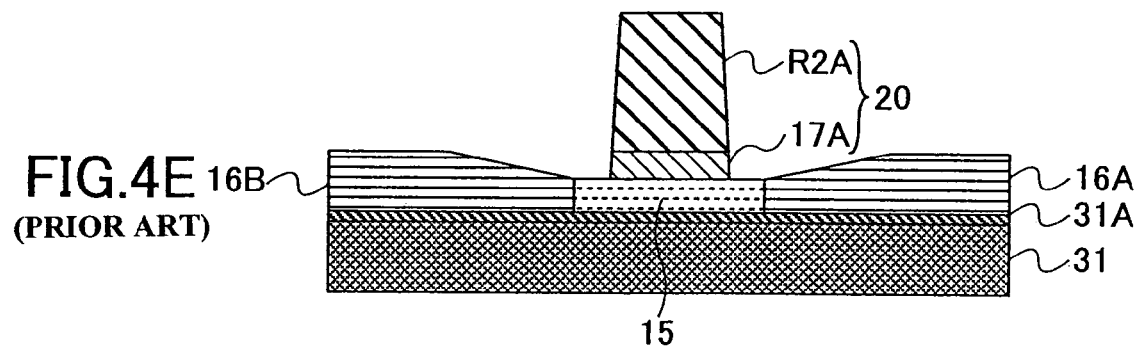
Figure 4F:
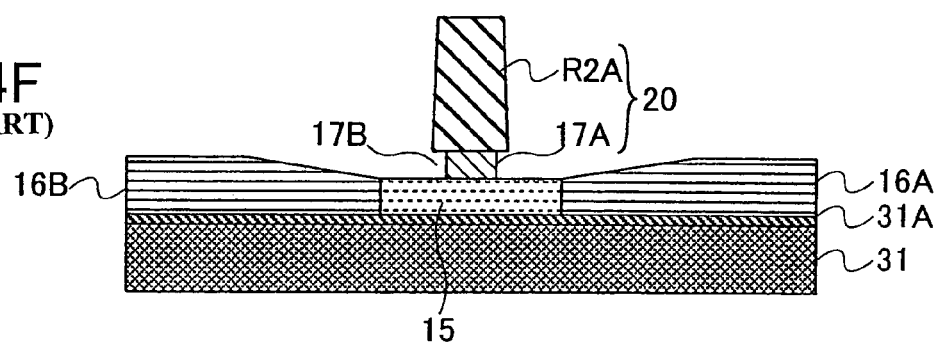
Figure 4G:
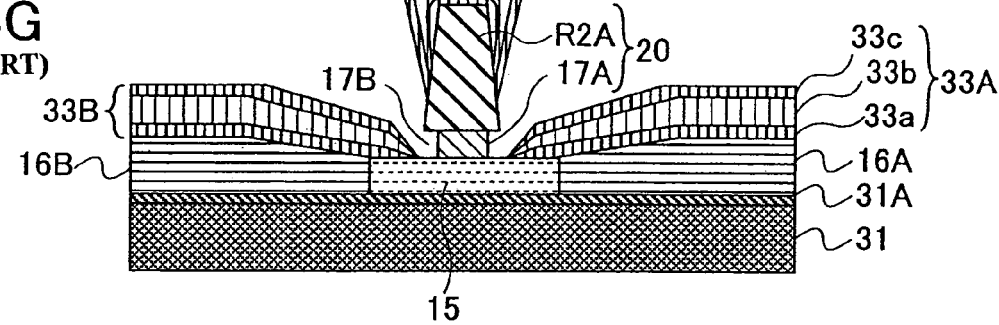
Figure 4H:
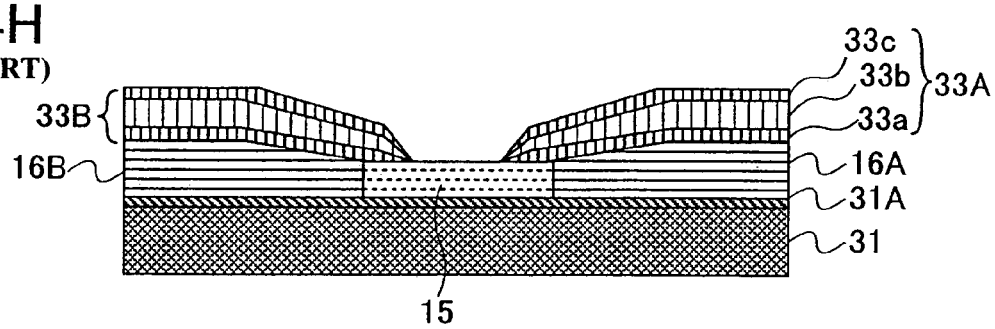
Figure 6D:
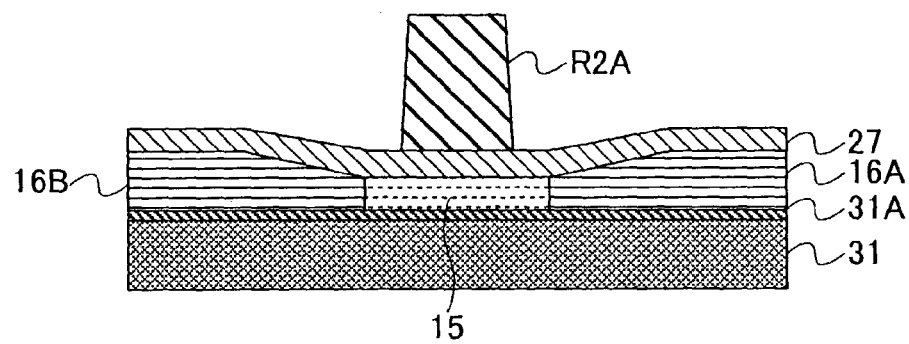

Next, in FIG. 6D of the process, the resist film R2 is exposed by a KrF excimer laser serving as a light source for exposure, and developed using TMAH solution. The resist pattern R2A is thereby formed so that width is set to, e.g., 160 nm. The resist pattern R2A forms an isolated pattern like the case of FIG. 4D.

Figure 6E:
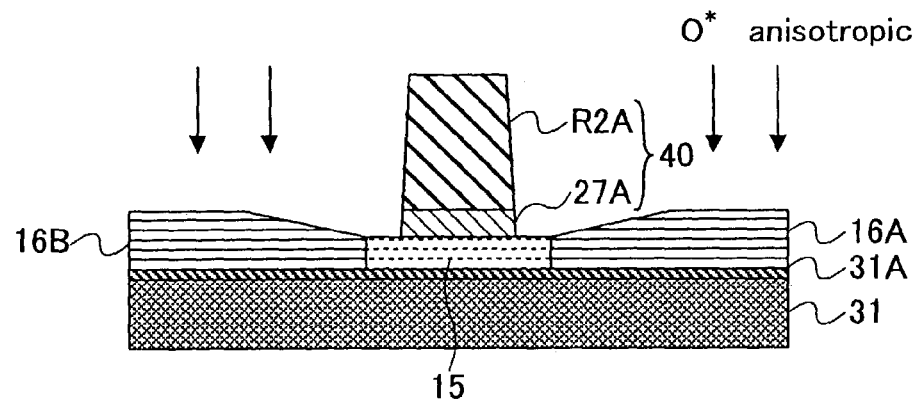

Next, in FIG. 6E of the process, an ICP (inductive-coupling type plasma) type dry etching process is performed via ICP etching equipment. In the dry etching process, O2 gas is supplied to a reaction chamber whose capacity is about 14 liters at a flow rate of 20 sccm at a pressure of about 0.4 Pa, and RF power at 13.56 MHz is supplied to an RF coil with a power of 100 W. Simultaneously, RF power at 13.56 MHz by a power of 200 W is supplied to a substrate holding stand as substrate bias, and then, oxygen plasma is generated in the reaction chamber. Further, anisotropy etching is performed on the exposed section of the antireflection film 27 for about 30 seconds using the oxygen plasma, the anisotropy etching being in a direction approximately perpendicular to the surface of the antireflection film 27, whereby the antireflection film 27 is removed at the exposed section as shown in FIG. 6E. Further, as shown in FIG. 6E, the antireflection film 27 is patterned, and the organic polymer film pattern 27A, which is the remainder of the antireflection film 27, is formed directly under the resist pattern R2A.

Next, at FIG. 6F of the process, O2 gas is supplied to the reaction chamber of the ICP etching equipment at a flow rate of 30 sccm, and 13.56 MHz RF power is supplied to the RF coil at a power of 50 W under a pressure of 1 Pa. Further, a lift-off mask pattern 40 including the resist pattern R2A and the antireflection film 27A is formed on the magnetoresistance element 15 by setting the value of the RF power supplied to the substrate holding stand at 0 W to generate oxygen plasma, and performing isotropic etching for about 7 minutes using the oxygen plasma.

In the case of the isotropic dry etching at FIG. 6F, the rate of etching speeds of the organic polymer film pattern 27A including the ARC-XLX to the resist pattern R2A including a positive type resist film for KrF excimer lasers ranges between 111.3 and 1.5. Consequently, lateral etching of the organic polymer film pattern 27A is carried out, and an undercut 27B is formed.

When the width of the resist pattern R2A is 90 nm, and the width of the organic polymer film pattern 27A is 50 nm, the depth of the undercut 27B is about 20 nm on both sides of the pattern 27A.

Further, at FIG. 6G of the process, a Ta film 33a, a Au film 33b, and a Ta film 33c are deposited in thicknesses of 5 nm, 30 nm, and 5 nm, respectively, one by one by a sputtering method using the lift-off mask pattern 40 including the polymer film organic pattern 27A and the resist pattern R2A as a mask, and thereby forming a reading electrode layer 33 including the Ta/Au/Ta laminate. Reading electrode patterns 33A and 33B including the Ta/Au/Ta laminate are formed on the hard bias patterns 16A and 16B, respectively, on both sides of the lift-off pattern 40, while forming the reading electrode layer 33.

In FIG. 6G of the process, the organic polymer film pattern 27A is formed with an 80 nm thickness corresponding to the antireflection film 27, and the undercut section 27B is respectively formed in 20 nm thickness on both sides of the organic polymer film pattern 27A. Accordingly, the reading electrodes 33A and 33B, when formed, are disassociated from the electrode layer 33 deposited on the resist pattern R2A by a step part formed by the resist pattern R2A.

Figure 3:
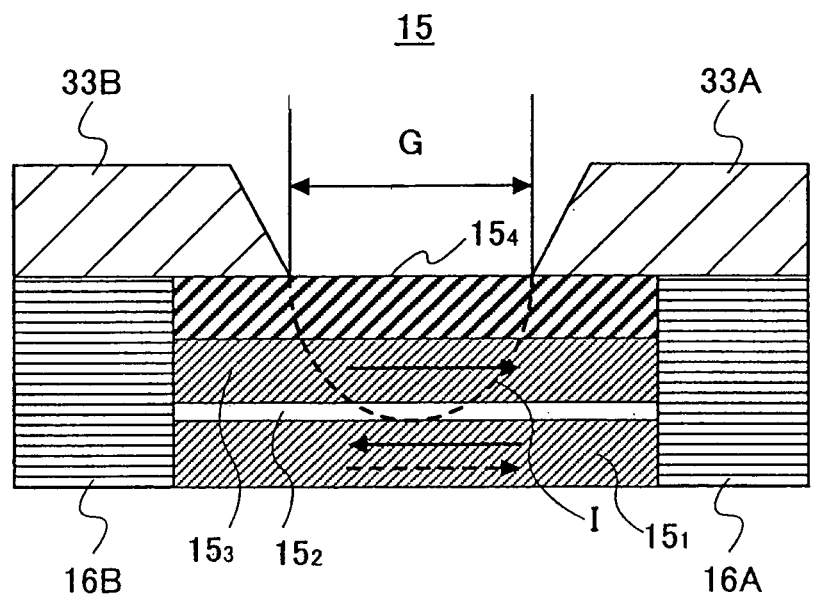
FIG. 3 shows the magnetic sensors of FIG. 2 in detail.

Further, as is shown in FIG. 6G, since the tip section of the reading electrode patterns 33A and 33B advance into the undercut section 27B near the organic polymer film pattern 27A on the upper surface of the magnetoresistance element 15, the effective core width G described previously in reference to FIG. 3 can be reduced to about 250 nm.

Next, at FIG. 6H of the process, the resist pattern R2A is removed using acetone, and simultaneously, the electrode layer 33 deposited on the resist pattern R2A is removed. Further, an organic polymer film pattern 27A is removed using NMP (N-methyl pyrrolidone).

Figure 1:
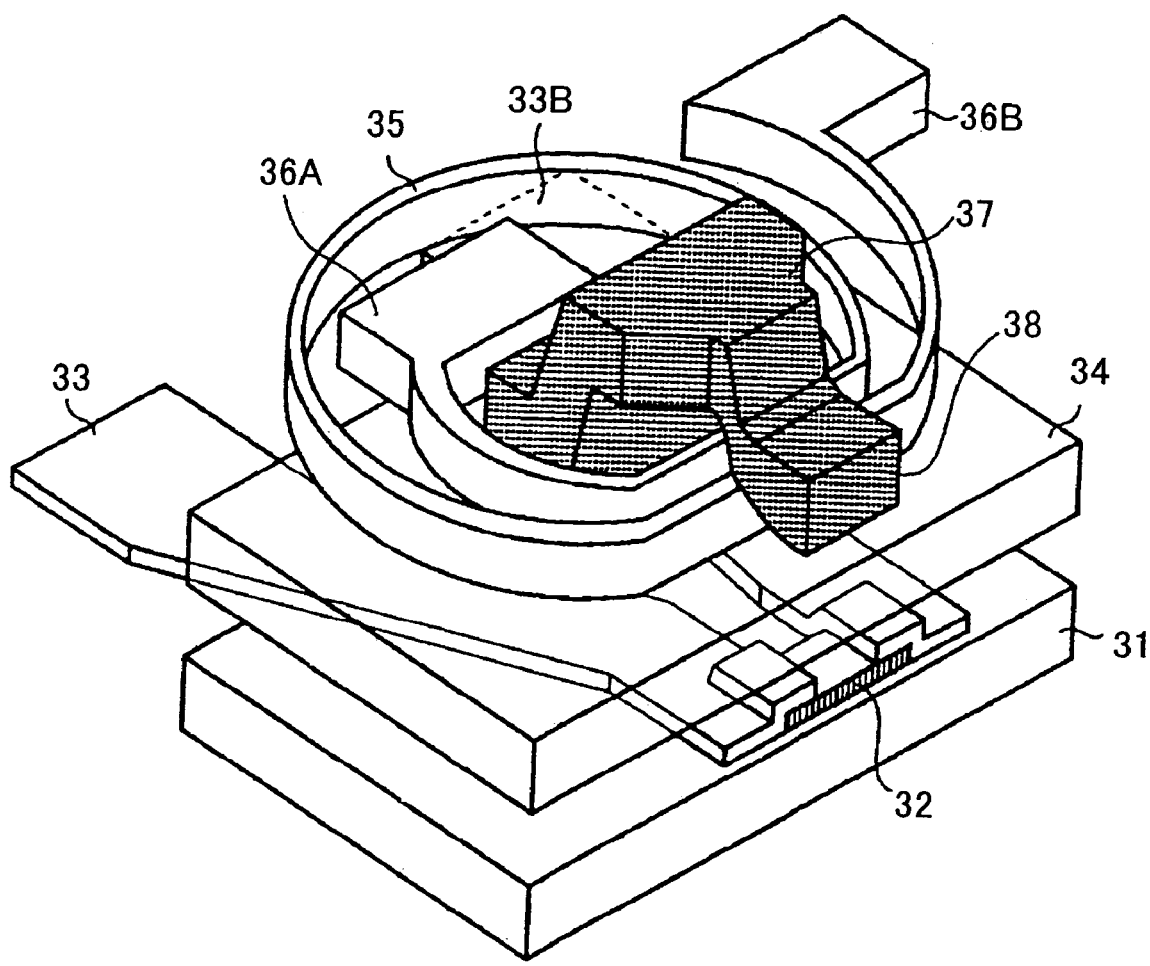
FIG. 1 shows structure of a conventional compounded type magnetic head.
Figure 2:
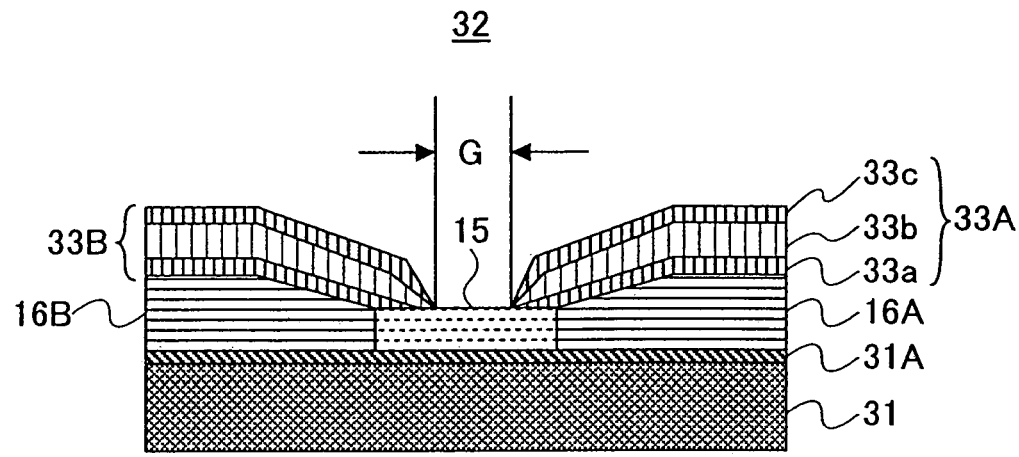
FIG. 2 shows structure of a magnetic sensor used in the compounded type magnetic head of FIG. 1.

Then, a NiFe alloy layer 34 (refer to FIG. 1) that constitutes an upper magnetic shield layer and a lower magnetic pole layer is formed by the conventional electrolytic plating method through the gap spacer layer including $Al_2O_3$, and the writing gap layer including AlO3.

Subsequently, the first layer insulation film including a resist film is formed, on which a Cu layer is further formed by the electrolytic plating method in a horizontal spiral pattern form, and a writing coil 35 (refer to FIG. 1) is formed. Further, an electrode 36 is formed on both ends of the writing coil 35, which is then covered by a resist film, and a second layer insulation film is formed.

Further, a plating base layer including a Ti film is prepared on the second layer insulation film, on which a resist mask is formed. Using the resist mask as a plating frame, electrolytic plating of a NiFe film is selectively carried out on the second layer insulation film, and an upper magnetic pole layer 37 and a writing magnetic pole 38 of the tip section are formed.

Subsequently, the resist mask is removed, and then, the exposed section of the plating base layer is removed by carrying out ion milling using Ar ion. Then, an $Al_2O_3$ protective coat is formed on the surface. Then, the resulting substrate is diced, and the magnetic-head slider that integrates the reading head containing the magnetoresistance effect element 15, and the inductive type thin film magnetic head for writing is obtained.

As described above, according to this embodiment, a series of dry etching is carried out for patterning and slimming the lift-off pattern, and forming the lower undercut. In accordance with such a simple process, the magnetoresistance sensor that has a minute core width beyond the lithography limit can be manufactured with sufficient yield and sufficient precision.

In addition, the etching gas used in the dry etching process in the afore described embodiment is not limited to oxygen gas. It is also possible to use other gases that contain oxygen, such as CO, $CO_2$, NO, etc. that can generate oxygen plasma. Moreover, it is also possible to mix a nitrogen gas and Ar gas in the gas containing oxygen.

Further, the isotropic dry etching process of FIG. 6F is not limited to oxygen plasma processing, as an ozone process can alternatively be used. For example, the ozone process can be used for isotropic dry etching the resist pattern R2A and the antireflection film 27A, wherein an oxygen gas is provided to the processing chamber under a non-bias condition, and ozone is generated by irradiating an excimer light whose wavelength is 172 nm.

Further, the ozone process can employ a wet process. For example, the substrate in which the pattern for lift-off is formed can be soaked in ozone water. In this case, etching with higher isotropic characteristics is obtained.

[The Second Embodiment]

Figure 7A:
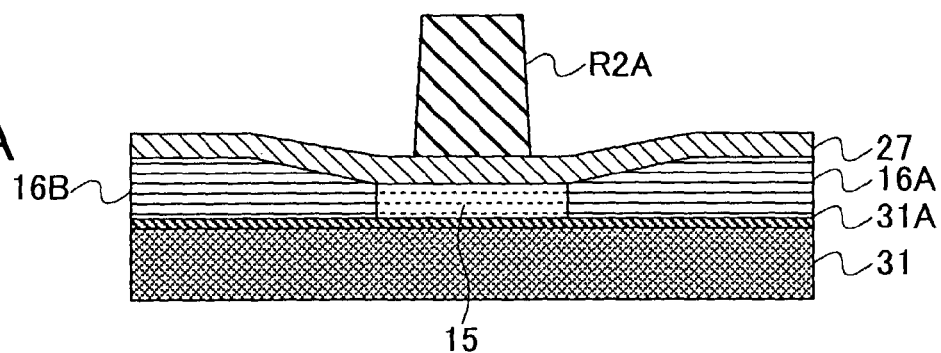
FIGS. 7A and 7B show a manufacturing process of a magnetic sensor according to a second embodiment of the present invention.
Figure 7B:
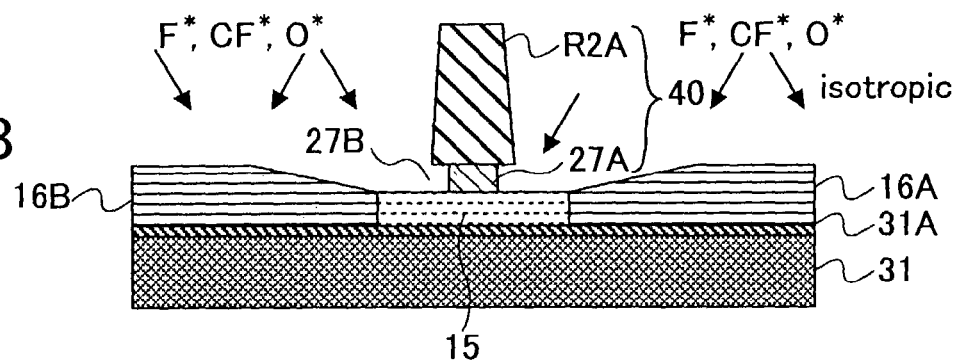

FIGS. 7A and 7B illustrate part of a manufacturing process of a magnetic head according to a second embodiment of the present invention. As regards items previously described, the same reference numbers are given, and description thereof is omitted.

In this embodiment, processes of FIGS. 6A through 6C are performed, and the structure of FIG. 7A is acquired at the process of FIG. 6D. That is, the process of FIG. 7A is equivalent to the process of FIG. 6D.

According to this embodiment, the anisotropy dry etching process of FIG. 6E is skipped after the process of FIG. 7A, and the process of FIG. 7B corresponding to the isotropic dry etching process of FIG. 6F is performed. However, in this embodiment, the resist film R2, and accordingly the resist pattern R2A, are formed by a commercially available Si content positive type resist for i-wire (brand name STPI-050 of Sumitomo Chemical Co., Ltd.) in a thickness of 460 nm, and the antireflection film 27 is formed in a 160 nm thickness by an ARC-XL20 film made by Brewery Science, Inc. Here, the ARC-XL20 film is of the polyimide system, and is insoluble to resist developing solution, such as TMAH solution, after a baking process.

With reference to FIG. 7B, dry etching in this embodiment is performed in the ICP type dry etching equipment like the previous embodiment, however, $CHF_3$ gas and oxygen gas are introduced at a flow rate of 5SCCM and 25SCCM, respectively, to the processing chamber as etching gases. By supplying a 13.56 MHz RF to the RF coil at a power of 50 W under a pressure of 1 Pa, fluorine radical F* and CF radical CF* are formed in the processing chamber in addition to oxygen radical O*.

In this case, according to this embodiment, RF power is not provided to the substrate holding stand. Anisotropy etching is performed on the antireflection film 27 by the various radicals in the processing chamber. By carrying out this isotropic etching for 7 minutes, for example, patterning of the antireflection film 27 is carried out according to the resist pattern R2A, and the organic polymer film pattern 27A is formed directly under the resist pattern R2A. Simultaneously, the resist pattern R2A and the formed organic polymer film pattern are also subjected to lateral etching, and the sizes thereof are reduced.

When the Si content resist was used as the resist film R2, and the ARC-XL20 film was used as the antireflection film 27, it was found that the etching speed ratio between the resist pattern R2A and the organic polymer film 27A became about 1:2, and that when the resist pattern R2A was slimmed, the undercut 27B was simultaneously formed at the polymer organic film 27A.

For example, when the width of the resist pattern R2A was 110 nm in this embodiment, the length of the undercut 27B on both sides of the organic polymer film pattern 27A was about 30 nm. Consequently, the organic film pattern 27A was carried out such that the width was about 50 nm. Accordingly, the overlaid type magnetism sensor of this embodiment has a core width of about 50 nm.

In addition, according to this embodiment, when the depth of the undercut 27B runs short on both sides of the organic polymer film pattern 27A, the required undercut depth can be obtained by carrying out lateral etching only of the organic polymer film pattern 27A by a dry etching process containing oxygen after the slimming process of FIG. 7B. Moreover, this additional etching process need not be limited to the plasma processing process using oxygen gas, and a process in ozone atmosphere can be used, where, for example, ozone is generated by irradiating the excimer light whose wavelength is 172 nm into oxygen atmosphere.

Further, immersing in ozone water also provides the desired result.

In addition, the dry etching process of FIG. 7B according to this embodiment is not limited to using the $CHF_3$ gas and oxygen gas, and other gases can be used, such as other fluorocarbon gases, such as $CF_4$, and other oxygen content gases, such as CO, and $CO_2$, and NO. Further, it is also possible to mix nitrogen gas and Ar gas in these etching gases.

The isotropic etching process of FIG. 7B can also be carried out using an ozone process like the previous embodiment. For example, the isotropic dry etching of the resist pattern R2A and the antireflection film 27A is carried out by the ozone that is generated by irradiating the excimer light whose wavelength is 172 nm to oxygen gas in the processing chamber under the non-bias condition.

Further, a wet process can be used as the ozone process. For example, the substrate on which the pattern for lift-off is formed is immersed in ozone water. In this case, a higher isotropic etching is available.

[The Third Embodiment]

Figure 8:
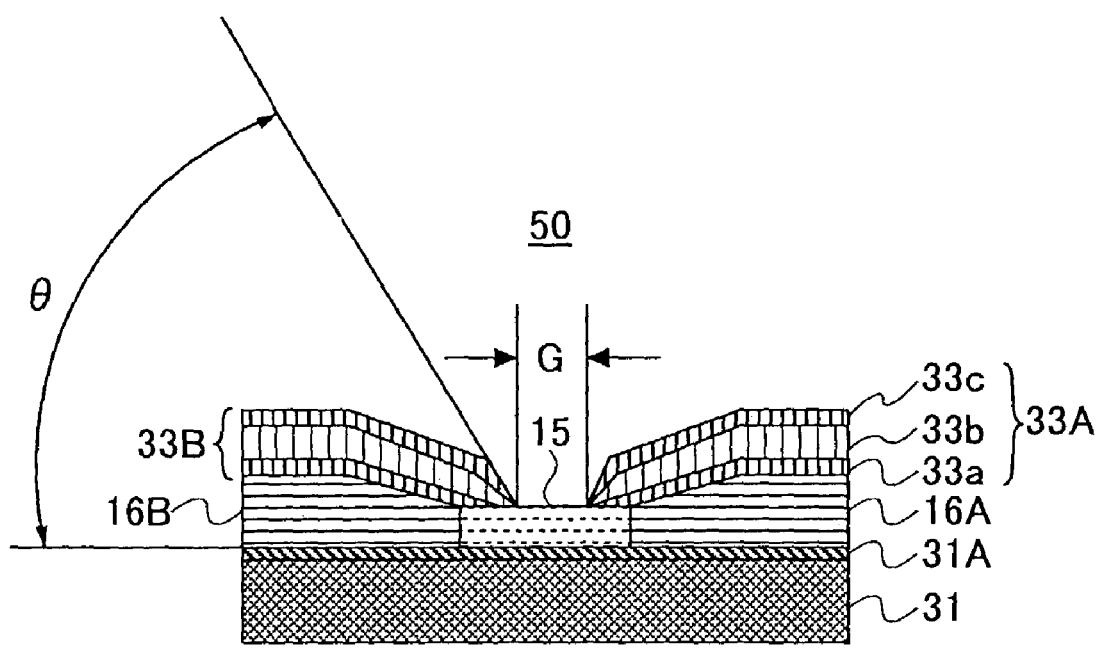
FIG. 8 shows structure of a magnetic sensor according to a third embodiment of the present invention.

The inventor of the present invention produced a magnetic sensor 50 having an optical core width G of 70 nm or less in experiments concerning the third embodiment of the present invention, the structure of which is shown in FIG. 8.

Especially, in this experiment, the taper angle θ of the tip sections of the electrodes 33A and 33B was changed by changing the thickness of the antireflection film 27, and the depth of the undercut 27B. The optical core width G of 70 nm corresponds to a recording density of 100 Gbit/inch$^2$ or more.

For example, at the process corresponding to FIG. 6B, patterning of the magnetoresistance element 15 was carried out at a width of 300 nm. Further, at the process corresponding to FIG. 6C, the ARC-XL20 film was formed in a thickness of 80 nm as the antireflection film 27, on which the Si content resist film STPI-050 was formed in a thickness of 460 nm as the resist film R2. In this case, the resist pattern R2A whose initial width was 250 nm was slimmed to a width of 170 nm, and the undercut 27B with a depth of 60 nm was formed on both sides of the organic polymer film pattern 27A as shown in FIG. 7B.

To this structure, a Ta film 33a, an Au film 33b, and a Ta film 33c, thickness being 5 nm, 30 nm, and 5 nm, respectively, were laminated one by one as at the process of FIG. 6G. In this case, the tip angle θ of the obtained electrode patterns 33A and 33B was 28 degrees, and the optical core width G in this case was 65 nm.

Then, a magnetic recording and reproducing apparatus was produced using a magnetic sensor having various optical core widths G and tip angles θ, and a reading property of the head was measured. It was found that Barkhausen noise occurred when the tip angle θ was 80 degrees and the optical core width G was 65 nm. In contrast, when the tip angle θ was 28 degrees, with the same optical core width G, Barkhausen noise was suppressed.

Specifically, in the magnetic sensor, the optical core width G of which is 70 nm or less, it was found out that Barkhausen noise can be effectively suppressed by setting the tip angle θ at 40 degrees or less, or more preferably, 30 degrees or less.

However, if the tip angle θ is set too small, terminal resistance of the electrodes 33A and 33B increases. For this reason, the tip angle θ is desirably set greater than 10 degrees.

In this manner, the optical core width G (cf. FIG. 8), and the tip angle θ of the electrodes 33A and 33B of the magnetic sensor 50, according to this embodiment, are set at 70 nm or less, and 40 degrees or less, respectively, and a magnetic head (cf. FIG. 1) capable of reading a signal, with suppressed noise, corresponding to the recording density of 100 Gbit/inch$^2$ or greater is obtained.

[The Fourth Embodiment]

Figure 9A:
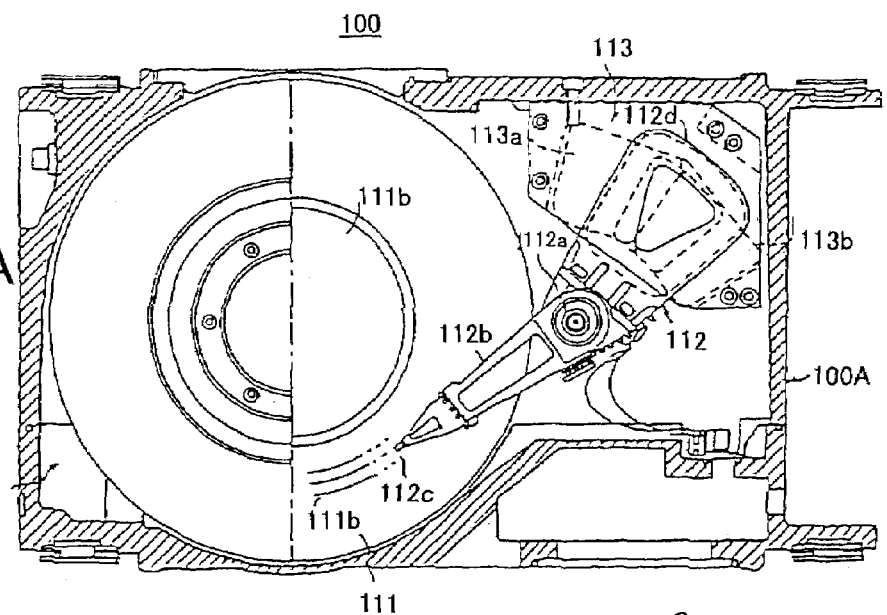
FIGS. 9A and 9B show structure of a magnetic recording apparatus according to a fourth embodiment of the present invention.

FIG. 9A shows the internal structure of a magnetic recording apparatus 100 according to the fourth embodiment of the present invention. On the left-hand side of FIG. 9A, the magnetic recording apparatus 100 having an upper cover removed is shown. On the right-hand side, structure of a magnetic disk assembly 110 of multi-stage structure is shown, which includes magnetic disks 111, and an arm assembly 112 that collaborates with the magnetic disks 111.

With reference to FIG. 9A, each of the magnetic disks 111 is fixed to a hub 111a that is driven by a motor that is not shown. The arm assembly 112 includes an arm 112b that is supported pivotally by a rotating axis 112a, and a magnetic head 112c prepared on a free end of the arm 112b. Further, a coil 112d that is a part of a voice-coil motor 113 is wound around another free end, which is opposite to the free end that supports the magnetic-head 112c on the arm 112b, and in parallel with the scan layer of the arm 112b. Further, magnets 113a and 113b that constitute other portions of the voice-coil motor 113 are prepared on the upper and lower sides of the coil 112d. By exciting the coil 112d, the arm 112 is freely rotated around the rotating axis 112a. The voice-coil motor 113 is servo-controlled such that the magnetic head 112c supported by the arm 112b follows a cylinder or track 111b of the magnetic disk 111.

Figure 9B:
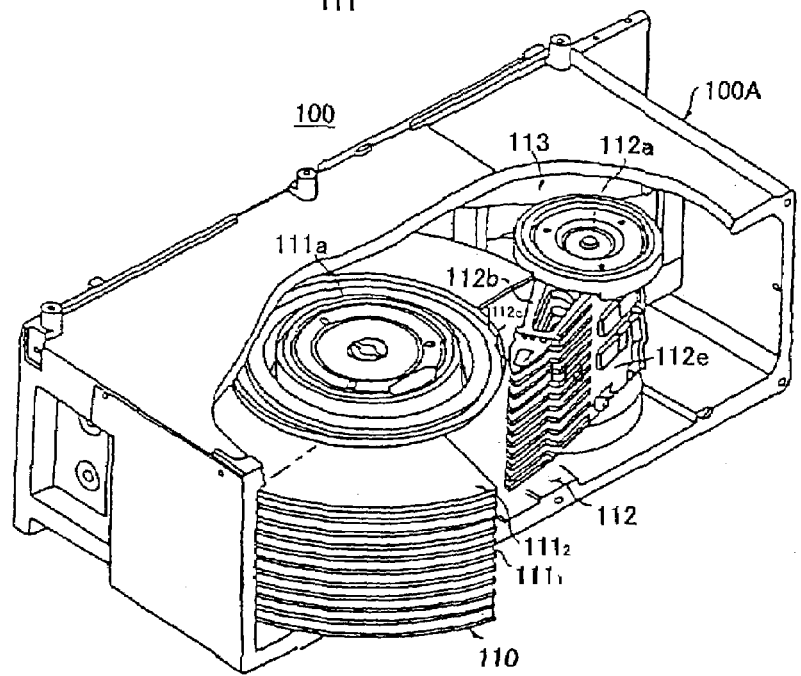

FIG. 9B is a perspective diagram showing the internal structure of the magnetic disk unit of FIG. 9A.

With reference to FIG. 9B, the magnetic disk assembly 100 includes a plurality of magnetic disks 111$_1$, 111$_2$, and so on, that are commonly held to the hub 111a that rotates. Corresponding to the magnetic disks, the arm assembly 112 also consists of a plurality of arms. The arms 112b are held by a common rotational movement unit 112e, which is rotation free around the rotating axis 112a, and moves rotationally according to rotational movement of the rotational movement unit 112e. Here, rotation of 112e is produced corresponding to excitation of the voice-coil motor 113. Further, the whole magnetic disk unit is stored in a cabinet 100A that is hermetically sealed.

In the present invention, reproduction of a very high density magnetic recording is attained by using the magnetic sensor as described in the first through the third embodiments as a reading head of the magnetic head 112c.

Further, the present invention is not limited to these embodiments, and various variations and modifications may be made without departing from the scope of the present invention.

For example, as the resist film R2, a Si content resist described in the Japanese Provisional-Publication-No. H11-130860 can be used. In this case, an etching speed ratio to the organic polymer in the isotropic etching process using oxygen plasma can be increased to 1:2 or greater.

Moreover, the resist film R2 is not restricted to an ultraviolet-ray resist, and an electron ray resist can also be used. In this case, a KrF excimer laser may be used for exposure, such that electron ray exposure is used.

Moreover, the magnetoresistance effect element 15 need not be limited to what uses a spin valve film, and the element using other giant magnetoresistance effects, such as a superstructure film, can be used, or alternatively, the usual magnetoresistance effect element may be used.

Moreover, the present invention is described with respect to a manufacturing process of a compounded type thin film magnetic head, however, the same is also applicable to a manufacturing process of a magnetic head that includes a reproducing head.

Moreover, although the present invention has been described with respect to a manufacturing process of a magnetic head as an example, the present invention is not limited to a manufacturing process of the magnetic head, but is also applicable to other manufacturing processes for forming a pattern for lift-off consisting of a miniaturized isolated pattern. For example, the present invention is applicable to forming an isolated line pattern prepared on a channel domain for forming a source drain electrode of TFT in a high precision LCD.

As mentioned above, although the present invention was described with respect to one or more desirable embodiments, the present invention is not limited to the specific embodiments, but various modifications and variations are possible within the scope of the present invention.

What is claimed is:

1. A manufacturing method of a magnetic head, comprising:
    a step for forming a lift-off mask pattern on a magnetoresistance effect element such that an upper part of the lift-off mask pattern is formed greater than a lower part of the lift-off mask pattern, said step for forming the lift-off mask pattern comprising the steps of:
        forming an organic polymer film on the magnetoresistance effect element;
        forming a resist pattern containing Si on the organic polymer film, and
        patterning the organic polymer film while using the resist pattern as a mask by conducting:
            a first dry etching process for patterning the organic polymer film using the resist pattern as a mask for forming an organic polymer pattern; and
            a second dry etching process for reducing magnitude of the resist pattern and the organic polymer pattern by laterally etching both the resist pattern and said organic polymer pattern, said second dry etching process being conducted such that an etching rate of said organic polymer pattern is larger than an etching rate of said resist pattern and such that said organic polymer pattern is formed with a lateral size smaller than a lateral size of the resist pattern, said organic polymer pattern and said resist pattern constituting said lift-off mask pattern,
    a step for forming a pair of electrodes on the magnetoresistance effect element using the lift-off mask pattern as a mask, and
    a step for removing the lift-off mask pattern,
    said second dry etching process being conducted by a mixed ambient containing first radicals etching said organic polymer pattern and second radicals etching said resist pattern.

2. The manufacturing method of the magnetic head as claimed in claim 1, wherein said second dry etching process is performed under isotropic etching conditions.

3. The manufacturing method of the magnetic head as claimed in claim 1, wherein said first dry etching process is performed under anisotropic etching conditions, and said second dry etching process is performed under isotropic etching conditions and is carried out after said first dry etching process.

4. The manufacturing method of the magnetic head as claimed in claim 1, wherein said second dry etching process is performed in etching gas containing fluorocarbon.

5. The manufacturing method of the magnetic head as claimed in claim 4, wherein said etching gas contains $CF_4$, $CHF_3$, and/or a mixture thereof.

6. The manufacturing method of the magnetic head as claimed in claim 1, wherein said second dry etching process is performed in etching gas containing fluorocarbon and oxygen.

7. The manufacturing method of the magnetic head as claimed in claim 6, wherein said etching gas contains $O_2$, CO, $CO_2$, NO, and/or a mixture thereof.

8. The manufacturing method of the magnetic head as claimed in claim 1, wherein said first dry etching process is performed under anisotropy etching conditions, etching being in direction approximately perpendicular to the organic polymer film, and said second dry etching process is performed under isotropic etching conditions.

9. The manufacturing method of the magnetic head as claimed in claim 1, wherein said second dry etching process is a plasma process using etching gas containing O2 gas.

10. The manufacturing method of the magnetic head as claimed in claim 1, wherein said organic polymer film is an antireflection film.

11. The manufacturing method of the magnetic head as claimed in claim 2, wherein said second dry etching process performed under the isotropic etching conditions comprises ozonization.

12. The manufacturing method of the magnetic head as claimed in claim 11, wherein said ozonization is performed in ozone gas that is generated from oxygen atmosphere by irradiating an excimer light whose wavelength is 172 nm.

13. A pattern forming method, comprising:
    a step for forming an organic polymer film on a substrate,
    a step for forming a resist pattern containing Si on the organic polymer film, and
    a dry etching process for patterning the organic polymer film using the resist pattern as a mask, such that an organic polymer pattern smaller than the resist pattern is formed with the organic polymer film under the resist pattern;
    wherein the dry etching process provides isotropic etching under a condition that the etching speed of the dry etching process of the organic polymer pattern is greater than the etching speed of the resist pattern,
    said process for forming the organic polymer pattern comprising:
        a first dry etching process for patterning the organic polymer film using the resist pattern as a mask, and
        a second dry etching process for reducing magnitude of the resist pattern and the organic polymer film,
        said second dry etching process being conducted in a mixed ambient containing first radicals etching said organic polymer pattern and second radicals etching said resist pattern.

14. A pattern forming method as recited in claim 13, wherein the step for forming a resist pattern on the organic polymer film comprises forming the resist pattern of a material that is different from the material forming the organic polymer film, such that the etching speed of the first dry etching process of the organic polymer film is greater than the etching speed of the second dry etching process of the resist pattern.

* * * * *